United States Patent [19]

Greco et al.

[11] Patent Number: 4,769,230

[45] Date of Patent: Sep. 6, 1988

[54] PROCESS FOR PREPARATION OF ARSENIC ACID

[75] Inventors: Nicholas P. Greco; Byung K. Ahn, both of Pittsburgh, John J. Kozak, Wexford, all of Pa.

[73] Assignee: Koppers Company, Inc., Pittsburgh, Pa.

[21] Appl. No.: 404,614

[22] Filed: Aug. 2, 1982

[51] Int. Cl.$^4$ ............................................. C01G 28/00
[52] U.S. Cl. .................................................. 423/617
[58] Field of Search ....................................... 423/617

[56] References Cited

U.S. PATENT DOCUMENTS 1,650,860 11/1927 Askenasy et al. ................. 423/617
1,974,747 3/1932 Latimer ............................. 423/617

Primary Examiner—John Doll
Assistant Examiner—Jackson Leeds
Attorney, Agent, or Firm—Donald M. MacKay; Herbert J. Zeh, Jr.

[57] ABSTRACT

Arsenic acid is formed from arsenous acid and water under oxygen pressure with catalytic amounts of nitric acid and a halide whereby the nitric oxide by-product is regenerated to nitric acid for contact with fresh arsenous acid.

15 Claims, No Drawings ated to nitric acid so as to obviate the prior art pollu-
PROCESS FOR PREPARATION OF ARSENIC ACID

BACKGROUND OF THE INVENTION

Arsenic Acid is useful in preparing wood preservatives. It is prepared commercially by the nitric acid or hydrogen peroxide oxidation of arsenous acid. In the nitric acid process, a stoichiometric amount of nitric acid is used. A plant is required to manufacture nitric acid from the oxides of nitrogen which are produced when arsenous acid is oxidized and the oxides of nitrogen cause a pollution problem when the gas is vented to the atmosphere. Evdokimov, Zhurnal Prikladnoi Khimii, Vol. 34, No. 5, pp. 1152-1154, describes the oxidation of arsenous compounds by nitric acid with atmospheric oxygen and a iodine catalyst at a concentration of 600 to 1000 ppm.

It is also reported that arsenous compounds can be oxidized by atmospheric oxygen with nitrogen oxides, nitric acid, and iodine on activated charcoal. Evodokimov, Zhurmal Prikladnoi Khimii, Vol. 33, No. 11, pp. 2435-2439.

The prior art processes suffer one or more disadvantages such as requiring either a stoichiometric amount of nitric acid, relatively large amounts of halide catalyst (e.g. 600-1000 ppm), high concentrations of nitric acid (e.g. 25%), consumption of 25% or more of the nitric acid, and high temperatures and pressures of 200°-300° C. and 60-80 atm.

Hydrogen peroxide, although non-polluting, is a very expensive oxidant.

Thus a need exists for an inexpensive non-polluting process for the production of arsenic acid which has now been discovered.

SUMMARY OF THE INVENTION

In accordance with the invention, arsenous acid is oxidized to arsenic acid inexpensively and without pollution. More particularly, the oxidation is conducted with oxygen and water and a minor but effective amount of halide and dilute nitric acid in a closed system under pressure to form nitric oxide which is regenerated to nitric acid so as to obviate the prior art pollution problem. The halide can be a chloride, bromide or iodide of an alkali metal such as sodium or potassium. The particular cation with which the halide is combined is unimportant, however, as it does not have any effect on the reaction. Moreover, elemental chlorine, bromine or iodine can be employed to provide the halide. If desired, the nitric acid can be formed in situ by the use of NO, NO₂ or N₂O₄ with oxygen and water. The reactions can be illustrated as follows:

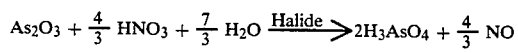

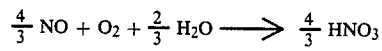

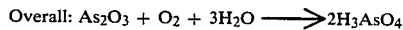

DETAILED DESCRIPTION OF THE INVENTION

In accordance with the invention, nitric acid can be employed in a concentration of from about 1% to about 70%, preferably from about 1 to about 20% and most preferably from about 1 to about 5%. Dilute nitric acid of about 1 to about 5% is most preferred becaused there is little nitric acid in the product. The use of more concentrated nitric acid requires separation steps such as distillation to remove it or it can be recycled back to feed arsenic trioxide. Less than a stoichiometric amount of nitric acid is required such as between about 2 and 30% of stoichiometry and most preferably between about 2 and 8% stoichiometry. The halide can be employed in an amount from about 20 ppm to about 600 ppm and preferably between about 20 and about 60 ppm. The pressure can be between about 20 and about 200 psig (preferably between about 20 and 100 psig) and the temperature between about 25° and about 200° C. (preferably between about 70°and 100° C.). Air or other oxygen source can be employed but pure oxygen is preferred because the nitrogen in air will increase the reactor pressure. Sufficient oxygen is required so that the nitric acid is not consumed. Reaction times of 1 to 4 hours are typical.

The following examples will serve to illustrate the invention and preferred embodiments thereof. All parts and percentages in said examples and elsewhere in the specification and claims are by weight unless otherwise indicated.

EXAMPLES

A Parr model 4641 stainless steel reactor was employed having an axial flow impeller turning at 600-1100 rpm, a pressure vent, a gas inlet, a sample valve for addition or removal of reactants or products, a 1000 psig oxygen pressure gauge and a thermowell for monitoring reaction temperature and controlling an external heater. The rate of oxygen consumption for nitric acid regeneration was monitored with a Matheson model 601 gas flow meter installed between an oxygen supply cylinder and the reactor.

The desired product is an arsenic acid solution of high concentration. A typical reaction mixture is such that the final solution is at least 75% arsenic acid solution. To meet this requirement, the initial mixture consists of 300 g arsenic trioxide (arsenous acid over 95% pure), 200 g water, 5.81 g of 70.8% nitric acid (4.11 g of 100%) and 0.03 g potassium iodide. Based on the weight of water plus nitric acid, this composition produces a nitric acid concentration of 2.0% which is 3.3% of the stoichiometric amount required, and a potassium iodide concentration of 150 ppm based on water (60 ppm based on the total weight of reaction mixture i.e., water plus solids) which is $3 \times 10^{-3}\%$ of the stoichiometric amount required to completely oxidize arsenic trioxide. The weight of arsenic trioxide is excluded from the calculations because it is only slightly soluble in water (i.e., it exists as a slurry, easily agitatable).

A typical procedure is as follows:

The reactor is charged with arsenic trioxide, water, and potassium iodide. It is then sealed and tested for leaks, and purged with nitrogen or oxygen. The vent is opened and nitric acid is introduced through the sample valve. After closing all valves, oxygen is introduced until 50 psig is indicated on the reactor pressure gauge. At this point, the stirring is started and the heater turned on. The temperature inside the reactor is increased until the reaction starts, as indicated by a sudden temperature rise (without cooling) and a slight rise or drop of the reactor pressure; by 20°-30° C. and 2-5 psig, respectively. Preferably the exothemic reaction is controlled by means of external cooling means such as a cooling jacket.

At this point control of oxygen flow rate is important. If an insufficient amount of oxygen is supplied, a rather sharp increase in pressure is observed (by 50-100 psig), making it necessary to increase the oxygen regulator setting in order to maintain oxygen flow into the reactor. There also exists a technical possibility, in case of severe oxygen deficiency in the reactor, nitric acid could be reduced to $N_2O$ or further to nitrogen, which would result in no regeneration of nitric acid by oxygen, causing the oxidation to stop unwantedly. The temperature control can be accomplished with the use of cooling coils.

The reaction is then allowed to proceed to completion which occurs within several hours after the oxygen absorption is first noted. The completion is indicated by a drop in temperature and in oxygen consumption (flow rate to zero).

Upon completion, the reactor is cooled and vented, then opened to recover the product. If the reaction has been completed, the product is a cloudy solution containing a small amount of fine, suspended solid (from impurities in arsenic trioxide) which can be removed by filtration to yield a clear, pale yellow solution. The volume and weight are measured, and the concentrations of arsenic trioxide unreacted and arsenic acid produced are determined by iodi/iodo-metric titrations. From these determinations, the conversions and yields are calculated, and reported in the following Table I:

TABLE I

| Run # | HNO₃ Initial Conc. (%) | HNO₃ % Stoichiometry | (KI) Initial (ppm) | As₂O₃ Initial (g) | (H₃AsO₄) Produced (%) | % Conversion | Reactor psig | Reactor °C. | Hours |
|---|---|---|---|---|---|---|---|---|---|
| 1 | 10-20 | — | 3000 | 600 | 44 | 100 | 50 | 20-80 | 6½ |
| 2 | 5 | 14.3 | 60 | 200 | 63 | 100 | 100-150 | 125-150 | 1 |
| 3 | 5 | 8.1 | 60 | 300 | 78 | 100 | 115-160 | 120-150 | 1 |
| 4 | 1 | 1.6 | 60 | 300 | 78 | 100 | 125-190 | 150-195 | 4 |
| 5 | 10 | 18.3 | 60 | 300 | 75 | 100 | 130-220 | 79-112 | 2 |
| 6 | 5 | 8.5 | 60 | 300 | 82 | 92 | 46-80 | 86-102 | 1 |
| 7 | 2 | 3.3 | 60 | 300 | 82 | 100 | 6-88 | 74-112 | 2 |
| 8 | 2 | 3.3 | 60 | 300 | 78-80 | 100 | 72-90 | 94-109 | 1 |
| 9 | 3 | 4.6 | 600 | 300 | 77 | 100 | 40-70 | 75-110 | 2 |
| 10 | 2 | 3.3 | 30 | 300 | 77 | 100 | 50-76 | 72-106 | 3 |
| 11 | 2 | 3.3 | 20 | 300 | 62 | 99 | 50-81 | 40-95 | 2 |
| 12 | 1 | 1.85 | 20 | 300 | 57 | 99 | 62-94 | 90-109 | 3 |
| 13 | 2 | 3.3 | 60 | 300 | 69 | 71 | 57-90 | 60-76 | 4 |
| 14 | 2 | 3.3 | 60 | 300 | 79 | 99 | 65-84 | 70-94 | 3 |
| 15 | 10-20 | 20 | — | 600 | 0 | 0 | 50 | 20-80 | 6½ |

Because of the corrosive nature of the arsenic acid formed, it was found that temperatures above about 100° C. were found detrimental to maximum reactor life for 316 stainless steel. From the results reported in the table, it can be seen that 20-60 ppm KI was satisfactory at 2% HNO₃, and 20 ppm at 1% HNO₃. Moreover, a ≧99% conversion was obtained at ≧100° C. ( <½ hour at 100°-110° C.), and 1-3 hours reaction time.

While the above description and examples are illustrative of the invention, numerous obvious modifications will appear to one of ordinary skill in the art and accordingly the invention is intended to be limited only by the appended claims.

What is claimed is:

1. A process for the preparation of arsenic acid from arsenous acid which comprises reacting said arsenous acid with water and a minor but effective catalytic amount of nitric acid in an amount between about 2% and about 30% of the theoretical amount required to oxidize the arsenous acid with water to arsenic acid, in a concentration of from about 1% to about 20% in the presence of a minor but effective amount of halide catalyst in a closed reactor at elevated temperature under oxygen pressure and reacting the by-product nitric oxide (NO) which is formed with oxygen and water at elevated temperature and pressure to regenerate nitric acid which is used to contact fresh arsenous acid.

2. The process of claim 1 wherein the nitric acid is present in an amount between about 2% and about 8% of the theoretical amount required to oxidize the arsenous acid with water to arsenic acid.

3. The process of claim 1 wherein the nitric acid concentration is from about 1 to about 5%.

4. The process of claim 1 wherein the nitric acid is present in an amount between about 2% and about 8% of the theoretical amount required to oxidize the arsenous acid with water to arsenic acid, in a concentration of from about 1% to about 5%.

5. The process of claim 1 wherein the halide is a chloride, bromide or iodide in an amount between about 20 ppm and about 600 ppm.

6. The process of claim 1 wherein the halide is a chloride, bromide or iodide in an amount between 20 ppm and about 60 ppm.

7. The process of claim 1 wherein the temperature is maintained between about 25° C. and about 200° C.

8. The process of claim 1 wherein the pressure is maintained between about 20 psig and 200 psig.

9. The process of claim 1 wherein the temperature and pressure are maintained between about 25° C. and 200° C. and 20 psig and 200 psig.

10. The process of claim 1 wherein the halide is provided by elemental chlorine, bromine or iodine.

11. The process of claim 1 wherein the oxygen is pure oxygen.

12. The process of claim 1 wherein the nitric acid is present at a concentration of between about 1 and about 5%, and in an amount between about 2% and about 8% of the theoretical amount required to oxidize the arsenous acid to arsenic acid, the halide is present in an amount between about 20 ppm and about 600 ppm, the temperature and pressure are maintained between about 25° C. and 200° C. and 20 psig and 200 psig, and the oxygen is pure oxygen.

13. The process of claim 1 wherein the nitric acid is formed in situ from nitric oxide (NO).

14. The process of claim 1 wherein the nitric acid is formed in situ from nitrogen tetroxide ($N_2O_4$).

15. The process of claim 1 wherein the nitric acid is formed in situ from nitrogen dioxide ($NO_2$).

* * * * *